(12) United States Patent
Summers

(10) Patent No.: US 8,978,143 B2
(45) Date of Patent: Mar. 10, 2015

(54) REVERSE AUTHORIZED SYN COOKIE

(71) Applicant: Dow Summers, Reston, VA (US)

(72) Inventor: Dow Summers, Reston, VA (US)

(73) Assignee: Verisign, Inc., Reston, VA (US)

( * ) Notice: Subject to any disclaimer, the term of this patent is extended or adjusted under 35 U.S.C. 154(b) by 137 days.

(21) Appl. No.: 13/732,923

(22) Filed: Jan. 2, 2013

(65) Prior Publication Data

US 2014/0189805 A1 Jul. 3, 2014

(51) Int. Cl.
*H04L 29/06* (2006.01)

(52) U.S. Cl.
CPC .......... *H04L 63/126* (2013.01); *H04L 63/1458* (2013.01)
USPC ............................................ 726/25; 713/168

(58) Field of Classification Search
USPC .......................................................... 726/25
See application file for complete search history.

(56) References Cited

U.S. PATENT DOCUMENTS

| 7,337,470 | B2 | 2/2008 | Katz et al. |
| 2004/0034773 | A1* | 2/2004 | Balabine et al. ............... 713/168 |
| 2004/0083369 | A1* | 4/2004 | Erlingsson et al. ........... 713/176 |
| 2005/0220017 | A1 | 10/2005 | Brand et al. |
| 2006/0089994 | A1 | 4/2006 | Hayes |
| 2007/0195792 | A1 | 8/2007 | Chen et al. |
| 2011/0277032 | A1 | 11/2011 | Vargas |
| 2012/0072605 | A1 | 3/2012 | Xu et al. |

OTHER PUBLICATIONS

Extended European Search Report dated Mar. 28, 2014 issued in European Application No. 14150057.9 filed Jan. 2, 2014, pp. 1-6.

* cited by examiner

*Primary Examiner* — Yogesh Paliwal
(74) *Attorney, Agent, or Firm* — MH2 Technology Law Group, LLP

(57) ABSTRACT

Techniques for providing a service to registered users over a network such as the internet are disclosed. The techniques can be used to hide the service from unregistered entities. Further, the techniques can thwart certain types of so-called denial-of-service attacks.

24 Claims, 2 Drawing Sheets

REVERSE AUTHORIZED SYN COOKIE

TECHNICAL FIELD

The techniques provided herein relate to providing services on a network such as the internet.

BACKGROUND

Computer servers can provide computer clients with services over a network such as the internet. However, such servers can be vulnerable to denial-of-service attacks from malicious entities. Such attacks can swamp servers with data, rendering them unable to provide services to legitimate clients.

SUMMARY

According to some implementations, a technique for providing a service on a network is provided. The technique includes receiving a TCP SYN packet from a client directed to an IP address and port number derived from at least a one-time datum associated with the client, confirming that the TCP SYN packet is addressed to an authorized IP address and port number, sending a TCP SYN-ACK packet to the client, receiving a TCP ACK from the client, receiving a data packet from the client, the data packet comprising a client ID and the one-time datum, generating a calculated one-time datum based at least on the client ID, verifying that the one-time datum corresponds to the calculated one-time datum, and establishing a TCP/IP connection with the client in response to the verifying.

DESCRIPTION OF DRAWINGS

The accompanying drawings, which are incorporated in and constitute a part of this specification, illustrate implementations of the described technology. In the figures.

DETAILED DESCRIPTION

Some implementations of the present invention can hide server computers from unauthorized entities. Such implementations can accomplish this goal by providing services at random-appearing IP addresses and port numbers, which change at periodic intervals. Authorized, registered clients can locate the IP addresses and port numbers and obtain services from the server. Some implementations verify that a client computer attempting to establish a TCP/IP connection with the server has not only previously registered to do so, but also has possession of data from which the random-appearing IP addresses and port numbers can be derived.

Further, some implementations can thwart so-called SYN flood denial of service attacks. Such implementations can accomplish this by not establishing a TCP state relative to a potential client until after the potential client has provided appropriate data, e.g., data used to derive the random-appearing IP addresses and port numbers. Because no state is established until after the server verifies the client, the server keeps no record of half-open connections. This feature defeats malicious attempts to overrun the server's memory with records for multitudes of bogus connection attempts.

Reference will now be made in detail to example implementations, which are illustrated in the accompanying drawings. Where possible the same reference numbers will be used throughout the drawings to refer to the same or like parts.

Figure 1:
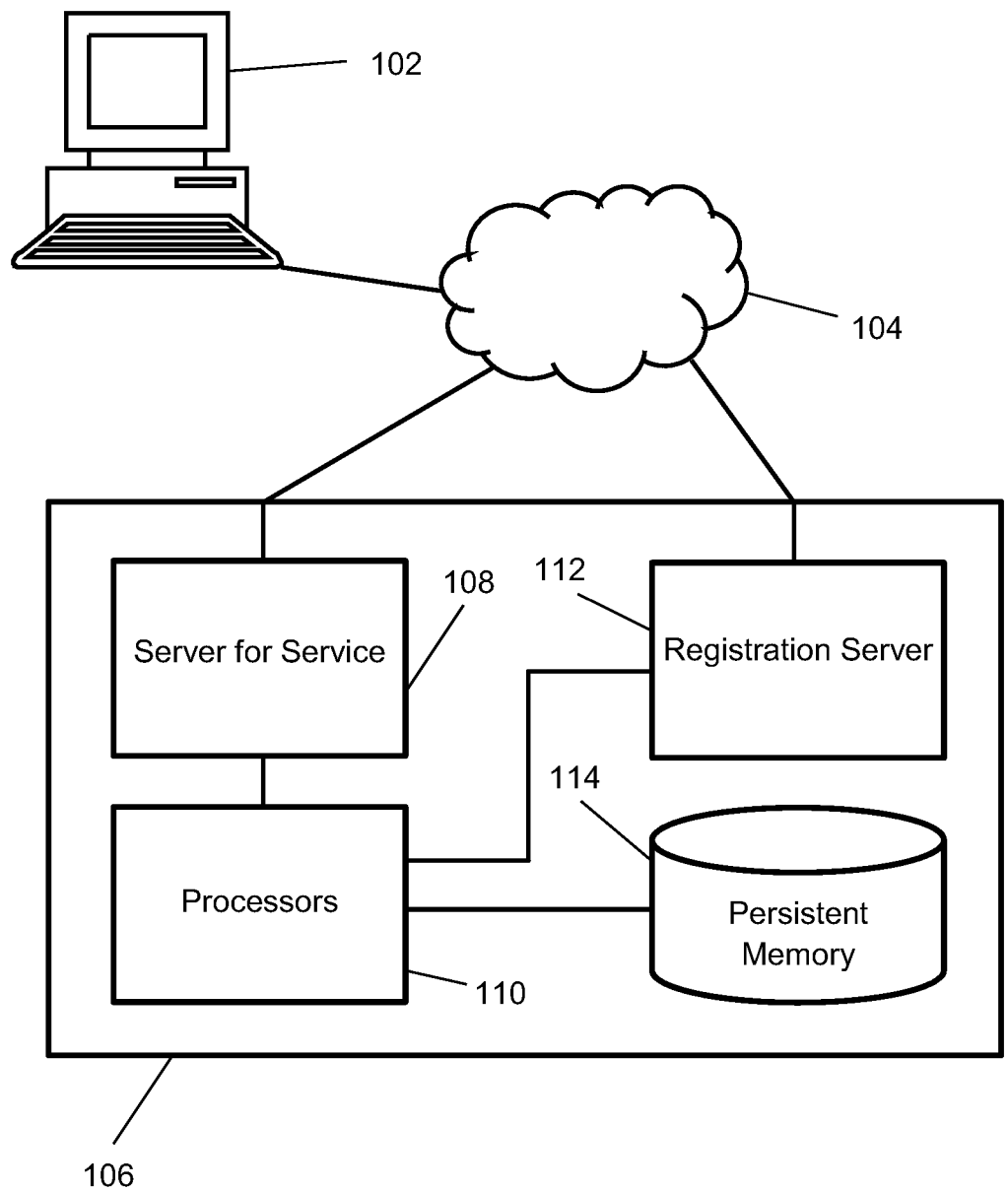
FIG. 1 is a schematic diagram of a system according to some embodiments of the present invention.

FIG. 1 is a schematic diagram of a system according to some embodiments of the present invention. In particular, FIG. 1 illustrates various hardware, software, and other resources that may be used in implementations of system 106 according to disclosed systems and methods. In embodiments as shown, system 106 may include one or more processors 110 coupled to random access memory operating under control of or in conjunction with an operating system. The processors 110 in embodiments may be included in one or more servers, clusters, or other computers or hardware resources, or may be implemented using cloud-based resources. Processors 110 may communicate with persistent memory 114 to access or store program instructions and other data for implementing the disclosed systems and methods. Processors 110 may, in general, execute control logic and control operations to implement the techniques disclosed herein.

System 106 further includes registration server 112. Registration server 112 is coupled to processors 110 and to one or more networks 104, such as the internet. Such coupling allows registration server 112 to communicate with client 102, or with another device or service. The communication can be a request for registration for a service provided by service server 108. The registration can be verified, e.g., by sending an email to a user-specified email address, where the email includes a link to a web page that only a user requesting the service using client 102 could obtain. Registration server can further provide data, such as a cookie, to client 102 such that client 102 can access a service provided by service server 108.

System 106 further includes service server 108. Service server 108 is coupled to processors 110 and to one or more networks 104, such as the internet. Service server 108 can provide a service to registered users, e.g., users of client 102. Such services can include, by way of non-limiting examples, electronic banking, electronic investing, electronic workrooms, job resources, electronic medical records or resources, etc. Service server 108 is configured to change accessible IP addresses and port numbers as discussed herein. Service server 108 is further configured to verify client 102 information as discussed below in reference to FIG. 2.

Client 102 can execute control logic, e.g., computer-executable software, to access service server 108. In particular, client 102 can execute control logic to locate and communicate with service server 108 in accordance with the techniques disclosed herein.

Other configurations of computer system 106, associated network connections, and other hardware, software, and service resources are possible.

Figure 2:
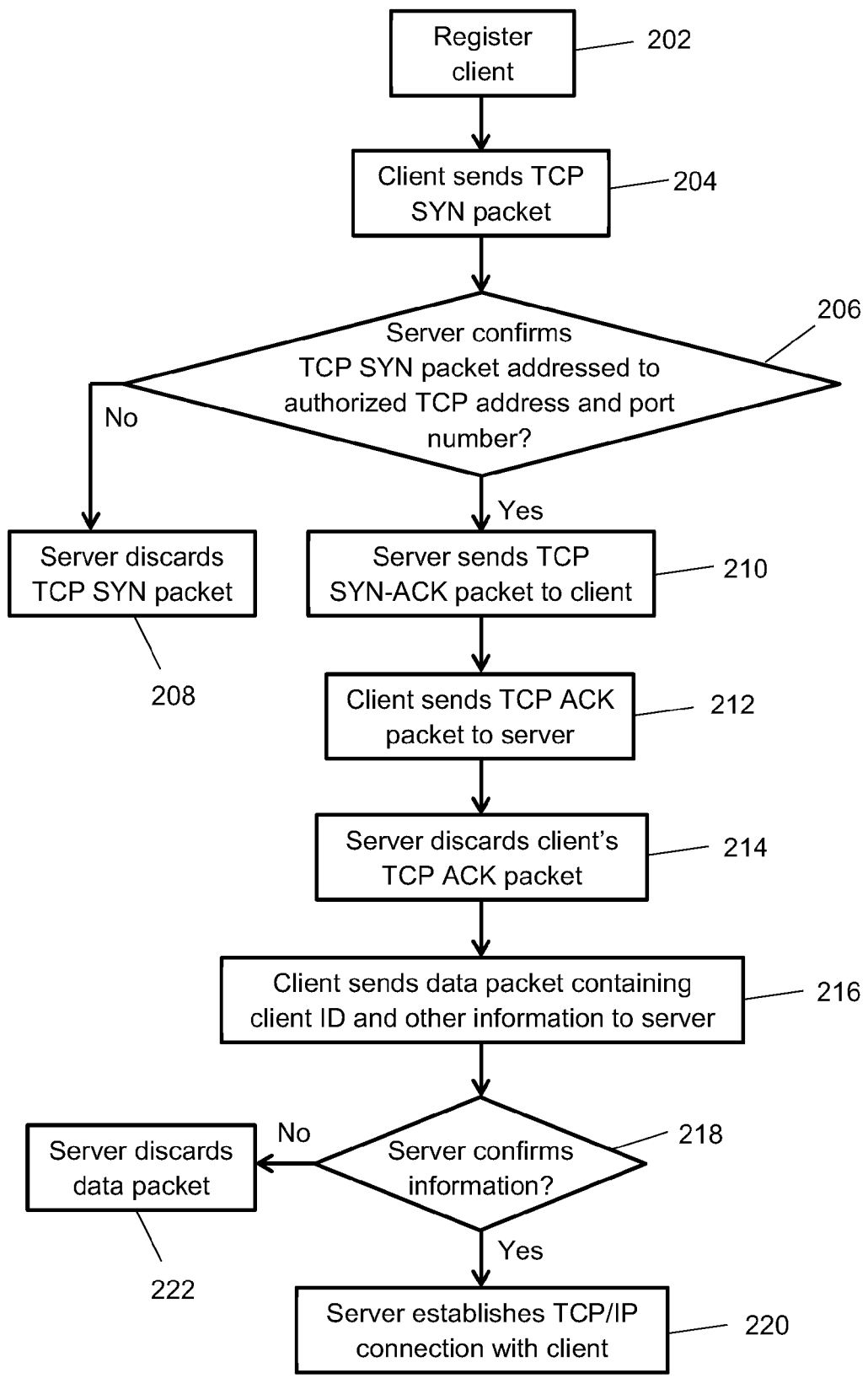
FIG. 2 is a flowchart of a method according to some embodiments of the present invention.

FIG. 2 is a flowchart of a method according to some embodiments of the present invention. The method depicted by FIG. 2 can be implemented, e.g., by system 106 of FIG. 1. Other implementations are also possible. Further, while the description herein of the method of FIG. 1 is described in relation to one client, it should be noted that a plurality of clients, e.g., on the order of hundreds, thousands, or tens of thousands can be accommodated by embodiments of the invention.

At block 202, system 106 registers client 102. The registration process can be conducted electronically, telephonically, by mail, or using any other suitable technology. The end result of the registration process of block 202 is that both client 102 and registration server 112 possess a unique, secret password in association with a client ID. The password, and possibly the client ID, can be a sequence of numbers, letters, symbols, or any combination thereof. The password, and possibly the client ID, can be implemented as a sequence of bits, e.g., unformatted for any particular visual representation. The password can be, e.g., 256, 512, or 1024 bits long. Registration server 112 can generate the password (and possibly the user ID) using a pseudo-random number generator or a true random number generator. In some embodiments, a user of client 102 selects the client ID. Each client registering according to block 202 receives a different password and different user ID. The password, and possibly the client ID, can be encrypted for transmission to client 102, e.g., using an asymmetric encryption algorithm or a hybrid encryption algorithm. System 106 stores the password in association with the user ID of client 102 in persistent memory 114, e.g., in a database.

At block 204, client 102 initiates a request for service. To do this, client 102 first determines an IP address and port number based on the client's password and the current time. An example determination of IP address and port number, based on a calculation according to Equation 1, follows presently. By way of non-limiting example, the destination IP address and port number can be calculated according to:

$$\text{DESTINATION} = (\text{BASE} \wedge \text{MASK}) \vee (\text{ONE-TIME-DATUM} \wedge \neg \text{MASK}) \quad (1)$$

In Equation 1, DESTINATION represents a generated IP address and port number within a specified range. BASE represents the top of the range, and MASK represents the bottom of the range. ONE-TIME-DATUM represents the one-time datum determined as describe elsewhere herein. The symbol "$\wedge$" represents a bitwise AND operator, the symbol "V" represents a bitwise OR operator, and the symbol "$\neg$" represents a bitwise NOT operator. All quantities in Equation 1 can be considered as hexadecimal values, which may be prefixed by "0x" by convention.

Thus, BASE and MASK set forth a range of possible IP addresses and port numbers. Service server 108 can specify such parameters, and client 102 can obtain such parameters during the registration process of block 202, at the time of the determination of the IP address and port number, or at any time prior to the time of the determination of the IP address and port number. In some implementations, client 102 obtains the BASE and MASK parameters from a proxy server at a fixed IP address and port number at a time of requesting a service, and the process can proceed to a new IP address and port number after calculating the DESTINATION based on those parameters. The obtained parameters can be stored at client 102 in, e.g., a cookie.

The ONE-TIME-DATUM can be based on the client's password and the current time. For example, ONE-TIME-DATUM can be calculated by using the client password as an input to a time-based password-generating algorithm, such as TOTP, modified to output one-time data of a particular bit length. As another example, ONE-TIME-DATUM can be obtained by providing the user password and current time (e.g., concatenated together) to a one-way hash algorithm, such as SHA-1. The current time can be local time, Greenwich mean time, or internet time (e.g., NIST internet time, or internet time provided by a private entity), for example. Computations for the ONE-TIME-DATUM can be configured to change periodically, e.g., every 30 seconds. For example, the current time can be rounded down to the earliest 30-second interval for purposes of calculating the ONE-TIME-DATUM. Other time intervals are also contemplated, e.g., every minute, every 20 seconds, every 10 seconds, etc.

An example application of Equation 1 follows. For a desired range of IP addresses between 192.168.0.0 through 192.168.255.255, BASE is set to 0xC0A8FFFFFFFF and MASK is set to 0xFFFF0000F000. For the hexadecimal numbers, the first eight digits are parsed pairwise and correspond to the IP address, and the last four digits are parsed as a whole and correspond to the port number. Thus, 0xC0 corresponds to 192, 0xA8 corresponds to 168, 0x00 corresponds to 0, 0xF000 corresponds to 61440, and 0xFFFF corresponds to 65535. For a ONE-TIME-DATUM of 0x324BA3E2734C and the above parameters, Equation 1 outputs a DESTINATION of 0xC0A8A3E2F34C. The latter number, 0xC0A8A3E2F34C, breaks out into 0xC0A8A3E2 for the IP address and 0xF34C for the port number. In decimal notation, properly parsed, the destination IP address for the above parameters is 192.168.163.266 and the port number is 62284. This concludes the example application of Equation 1.

Note that the present invention is not limited to the specific calculation according to Equation 1 for determining destination IP addresses and port numbers. Indeed, these parameters need not be calculated, but can be looked up instead. For example, both client 102 and service server 106 can share a table of IP addresses and port numbers associated with client IDs and time intervals for which they are active. Other calculations or other techniques are also possible.

To conclude block 204, client 102 sends a TCP SYN packet to the IP address and port number determined as part of this block. Service server 108 receives the SYN packet, and control passes to block 206.

At block 206, service server 108 confirms that it received the SYN packet addressed to an IP address and port number that is supposed to be active. To that end, service server 108 can keep a list of all active IP addresses and port numbers in association with user IDs and time periods. Service server 108 can do this by computing and pre-computing IP addresses and port numbers for each user ID and for one or more current and upcoming time intervals. Once service server 108 receives a SYN packet at a particular IP address and port number, service server 108 attempts to look up the IP address and port number in its list of valid IP address and port number pairs.

If, at block 206, service server 108 determines that the SYN packet arrived at an invalid IP address and port number, it can discard the packet according to block 208 and take no further action.

If, at block 206, service server 108 determines that the SYN packet arrived at a valid IP address and port number, it can reply with a TCP SYN-ACK packet at block 210. Service server 108 can discard the SYN packet.

Note that service server 108 does not store a record in persistent or volatile memory of the SYN packet it received. Server 108 does not keep a record of the half-open connection with client 102. In other words, service server 108 does not change its current TCP/IP state of LISTEN to SYN-RECEIVED or to any other state; service server 108 does not establish a TCP/IP state relative to client 102.

In some implementations, service server 108 sends a SYN-ACK packet in response to all SYN packets it receives, regardless as to whether they arrive at a valid IP address and port number or not.

At block 212, client 102 sends a TCP ACK packet to service server 108 in response to the SYN-ACK it received from service server 108. Service server 108 receives the ACK packet, and discards it at block 214. Again, service server 108 does not establish a TCP/IP state relative to client 102, nor does it keep a record of any open or half-open connection with the client. Accordingly, service server 108 does not maintain a record of receipt of the ACK packet in persistent memory.

At block 216, client 102 sends a data packet to service server 108. The data packet, which can be the first data packet sent from client 102 to service server 108, contains particular information in its data field. Specifically, the data field of the data packet contains the client ID for client 102 as well as information sufficient to identify the IP address and port number to which client 102 sent the packet. Such information can be, for example, the value of ONE-TIME-DATUM of Equation 1. (The values of the current time and client password could be sent in the alternative; in such implementations, at least the client password can be encrypted to protect its integrity.)

At block 218, service server 108 confirms the information it received in the data field of the data packet matches the IP address and port number at which it received the packet. To accomplish this, if the information includes a value of ONE-TIME-DATUM, service server 108 can compute DESTINATION using Equation 1, based on the shared values of BASE and MASK, and based on the received ONE-TIME-DATUM value. If the value of DESTINATION matches the IP address and port number at which service server 108 received the packet, then control passes to block 220. Otherwise, control passes to block 222.

Note that other techniques for confirming the received information are also possible. For example, if the received information includes encrypted values of the current time and client password, service server 108 can decrypt these values, use them to compute ONE-TIME-DATUM, and then proceed to calculate DESTINATION based on the common values for MASK and BASE. Service server 108 can match this information to the IP address and port number at which it received the packet, and proceed to either block 220 or 222 accordingly.

At block 222, service server 108 discards the data packet and the process can terminate. Accordingly, service server 108 does not establish a connection with client 102 if the confirmation of block 218 fails.

At block 220, service server 108 proceeds to establish a TCP/IP connection with client 102. Service server 108 can proceed to store (e.g., in persistent or volitile memory) stateful information about client 102, e.g., service server 108 can change its TCP/IP state to ESTABLISHED with respect to client 102.

Upon completion of block 220, service server 108 and client 102 can continue to communicate using the existing, or another, IP address and port number. In particular, service server 108 can provide the service to client 102. Upon completion of their communications, service server 108 and client 102 sever communications in accordance with standard TCP/IP protocol.

Some implementations do not randomize IP addresses and port numbers. Instead, such implementations maintain at least one fixed IP address and port number from which the service can be obtained. However, such implementations do verify that the clients are in possession of a secret datum shared with the server. In such implementations, the shared datum can be the password as described herein. Thus, such implementations utilize a method similar to that depicted in FIG. 2, with the following modifications. First, block 206 is omitted, and the server confirms receipt of the TCP SYN packet sent from the client and addressed to the fixed IP address and port number. Second, at block 216, the data packet contains the client ID and a shared secret datum, such as ONE-TIME-DATUM or the client password. In implementations where the shared secret datum is the client password, it can be encrypted using a shared secret key and a symmetric cryptographic algorithm, or using a public key and an asymmetric cryptographic algorithm, for example. At block 218, the server confirms that the client's data packet contains the shared secret datum, e.g., by decrypting it if necessary and comparing it to a copy of the shared secret datum stored in association with the client ID. The remainder of the method is essentially unchanged in such implementations.

In general, systems capable of performing the presented techniques may take many different forms. Further, the functionality of one portion of the system may be substituted into another portion of the system. Each hardware component may include one or more processors coupled to random access memory operating under control of, or in conjunction with, an operating system. Further, each hardware component can include persistent storage, such as a hard drive or drive array, which can store program instructions to perform the techniques presented herein. That is, such program instructions can serve to perform the disclosed methods. Other configurations of the first and second devices as discussed herein, and other hardware, software, and service resources are possible.

The foregoing description is illustrative, and variations in configuration and implementation are possible. For example, resources described as singular can be plural, and resources described as integrated can be distributed. Further, resources described as multiple or distributed can be combined. The scope of the presented techniques is accordingly intended to be limited only by the following claims.

What is claimed is:

1. A method of providing a service on a network, the method comprising:
   receiving a transmission control protocol (TCP) synchronize (SYN) packet from a client directed to an internet protocol (IP) address and port number derived from at least a one-time datum associated with the client;
   confirming that the TCP SYN packet is addressed to an authorized IP address and port number;
   sending a TCP synchronize-acknowledgement (SYN-ACK) packet to the client;
   receiving a TCP acknowledge (ACK) from the client;
   receiving a data packet from the client, the data packet comprising a client ID and the one-time datum;
   generating a calculated one-time datum based at least on the client ID;
   verifying that the one-time datum corresponds to the calculated one-time datum; and
   establishing a TCP/IP connection with the client in response to the verifying.

2. The method of claim 1, further comprising not storing any record of the receiving the TCP SYN packet from the client.

3. The method of claim 1, further comprising not establishing a SYN-RECEIVED state for a connection with the client.

4. The method of claim 1, further comprising not storing any record of the sending the TCP SYN-ACK packet to the client.

5. The method of claim 1, further comprising not generating a data structure for data representing half-open connections with clients.

6. The method of claim 1, further comprising registering a plurality of clients to provide each of the plurality of clients with a password unique to each client.

7. The method of claim 6, wherein the registering further comprises providing each of the plurality of clients with a user ID.

8. The method of claim 1, wherein the one-time datum is derived from a time and a hash function applied to at least a password for the client.

9. The method of claim 1, wherein the IP address and port number are derived as a function of a predefined range of IP and port numbers and the one-time datum.

10. The method of claim 1, wherein the confirming comprises confirming that the IP address and port number are among a set of periodically changing IP addresses and port number pairs, each IP address and port number pair specific to a single client.

11. The method of claim 10, wherein each IP address and port number in the set of periodically changing IP addresses and port numbers changes at least every 30 seconds.

12. The method of claim 1, wherein the generating comprises:
obtaining a password for the client based on the client ID;
obtaining a time associated with the TCP SYN packet;
calculating the calculated one-time datum as a function of at least the time associated with the TCP SYN packet and the password for the client.

13. A system for providing a service on a network, the system comprising:
at least one server comprising computer hardware configured to receive a transmission control protocol (TCP) synchronize (SYN) packet from a client directed to an internet protocol (IP) address and port number derived from at least a one-time datum associated with the client;
at least one hardware processor configured to confirm that the TCP SYN packet is addressed to an authorized IP address and port number;
at least one server comprising computer hardware configured to send a TCP synchronize-acknowledgement (SYN-ACK) packet to the client;
at least one server comprising computer hardware configured to receive a TCP acknowledge (ACK) from the client;
at least one server comprising computer hardware configured to receive a data packet from the client, the data packet comprising a client ID and the one-time datum;
at least one hardware processor configured to generate a calculated one-time datum based at least on the client ID;
at least one hardware processor configured to verify that the one-time datum corresponds to the calculated one-time datum; and
a server comprising computer hardware configured to establish a TCP/IP connection with the client.

14. The system of claim 13, wherein the system does not store any record of receiving the TCP SYN packet from the client.

15. The system of claim 13, wherein the system lacks a memory storing a SYN-RECEIVED state for a connection with the client.

16. The system of claim 13, wherein the system does not store any record of sending the TCP SYN-ACK packet to the client.

17. The system of claim 13, wherein the system lacks a data structure for data representing half-open connections with clients.

18. The system of claim 13, further comprising a server configured to register a plurality of clients and to provide each of the plurality of clients with a password unique to each client.

19. The system of claim 18, wherein the server configured to register is further configured to provide each of the plurality of clients with a user ID.

20. The system of claim 13, wherein the one-time datum is derived from a time and a hash function applied to at least a password for the client.

21. The system of claim 13, wherein the IP address and port number are derived as a function of a predefined range of IP and port numbers and the one-time datum.

22. The system of claim 13, wherein the at least one hardware processor configured to confirm is further configured to confirm that the IP address and port number are among a set of periodically changing IP addresses and port number pairs, each IP address and port number pair specific to a single client.

23. The system of claim 22, wherein each IP address and port number in the set of periodically changing IP addresses and port numbers changes at least every 30 seconds.

24. The system of claim 13, wherein the at least one hardware processor configured to generate is further configured to:
obtain a password for the client based on the client ID;
obtain a time associated with the TCP SYN packet;
calculate the calculated one-time datum as a function of at least the time associated with the TCP SYN packet and the password for the client.

* * * * *